April 29, 1958     E. M. DURAND     2,832,501
FUEL TANK CONSTRUCTION
Filed May 1, 1956
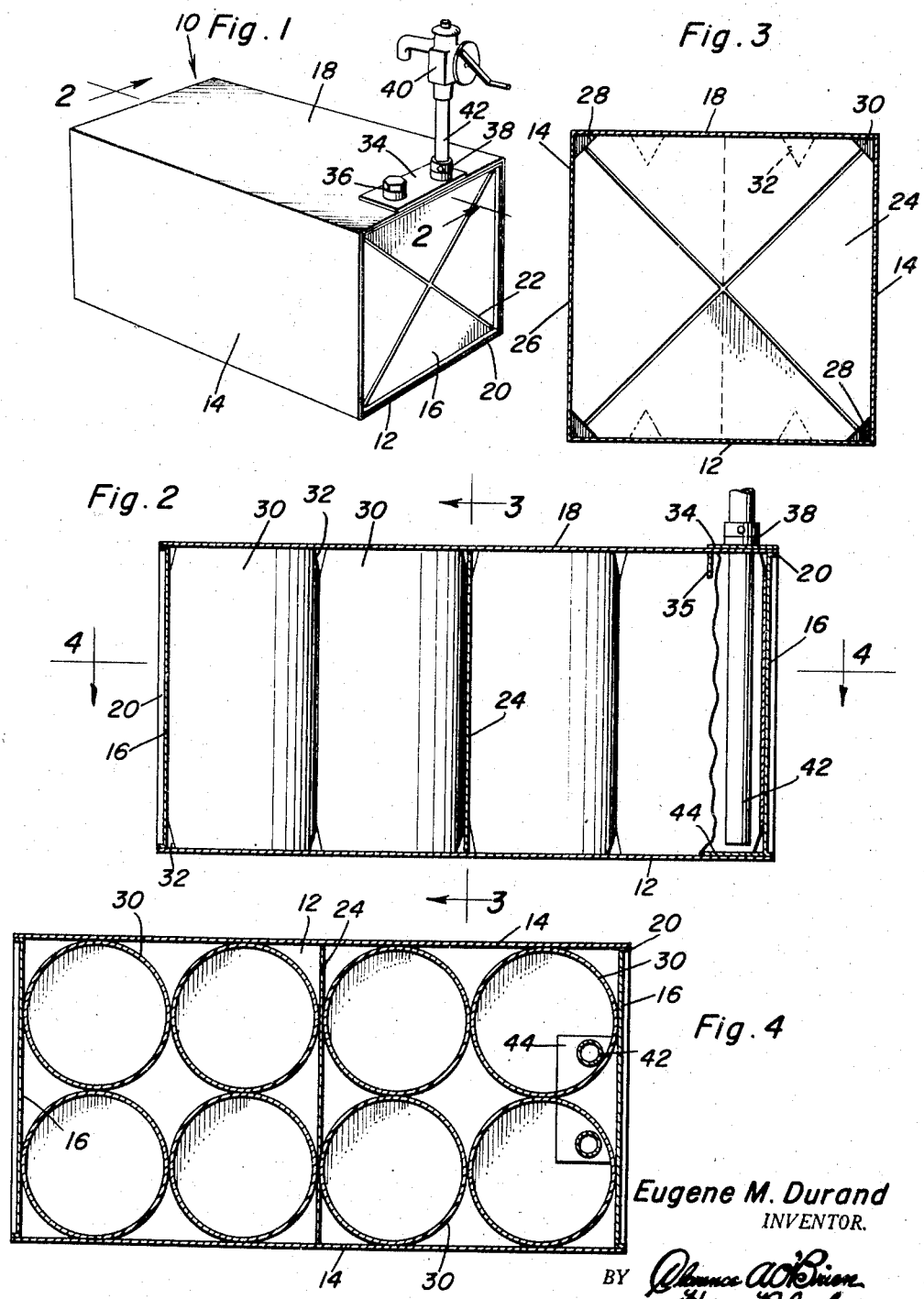
Eugene M. Durand
INVENTOR.

United States Patent Office 2,832,501
Patented Apr. 29, 1958

2,832,501

FUEL TANK CONSTRUCTION

Eugene M. Durand, El Centro, Calif., assignor of fifty percent to Irma L. Durand, El Centro, Calif.

Application May 1, 1956, Serial No. 581,990

3 Claims. (Cl. 220—22)

This invention generally relates to a tank construction and more particularly relates to a portable fuel tank construction incorporating features therein which prevent sloshing or rapid shifting of weight of the liquid fuel.

In recent years, the use of fuel burning machinery on farms for various purposes has become prevalent and it is necessary that fuel be transported to the fields or similar areas for replenishing the supply of fuel in such machines. In doing this, a small truck in the form of a pick-up truck is normally employed that has a fuel tank disposed in the load carrying area wherein the fuel tank is provided with a filler opening and a pump so that the truck may be driven to a position adjacent the machine for replenishing the supply of fuel in the machine. In doing this, it sometimes occurs that the fuel tank is only partially full wherein the partially filled tank of fuel will permit rapid movement and sloshing of the liquid fuel which provides a shift of weight on the truck thereby rendering the truck hard to maneuver and control and also causing excessive wear and damage to the running gear of the truck due to the shifting weight. Accordingly, it is the primary object of the present invention to provide a fuel tank which will prevent rapid shifting of the liquid fuel therein even though the tank may be only partially filled with fuel.

Another object of the present invention is to provide a fuel tank which is rigid in construction and constructed for long lasting use.

Other objects of the present invention will reside in its simplicity and rigidity of construction, reinforcement at points of wear, its adaptation for its particular purposes and is relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the fuel tank of the present invention;

Figure 2 is a longitudinal, vertical sectional view taken substantially upon a plane passing along section line 2—2 of Figure 1 illustrating the details of construction of the tank;

Figure 3 is a transverse, vertical sectional view taken substantially upon a plane passing along section line 3—3 of Figure 2 illustrating the construction of the baffle plate; and Figure 4 is a longitudinal plan sectional view taken substantially upon a plane passing along section line 4—4 of Figure 2 illustrating further structural details of the fuel tank.

Referring now specifically to the drawings, the numeral 10 generally designates the tank which is in the form of an elongated parallelepiped having a bottom 12, a pair of parallel upstanding side walls 14, a pair of parallel upstanding end walls 16 and a top wall 18 in parallel relation to the bottom 12. Each of the end walls 16 is provided with a peripheral perpendicular flange 20 which reinforces the periphery of the tank 10 and is secured thereto as by welding or any other suitable fastening means and the end wall 16 is provided with diagonal reinforcing ribs 22 thereby rigidifying the tank structure.

A centrally disposed transverse baffle plate 24 is provided within the tank 10 in parallel relation to the end walls 16 and spaced centrally therebetween with the edges being secured to the inner surface of the tank 10 by welding 26 or the like. The baffle plate 24 has the corners thereof cut off as indicated by the numeral 28 thereby forming relatively small openings at each corner of the tank 10 for permitting restricted flow of liquid past the baffle plate 24.

A plurality of cylindrical baffles 30 are disposed within the tank 10 between the bottom 12 and top 18 with the cylindrical baffles 30 being disposed against each other with the central baffles 30 being disposed with one side thereof against the baffle plate 24, wherein the baffle plate 24 together with the baffles 30 completely fill the interior of the tank 10.

Each of the cylindrical baffles 30 is provided with diametrically opposed inwardly extending V-shaped notches 32 on opposite sides thereof and on each end thereof to permit passage of liquid between the baffles 30 and for preventing rapid circulation of liquid within the tank 10. As illustrated in Figure 3, the notches 32 are in staggered relation to the openings formed by the omitted corners 28 of the baffle plate 24 thereby preventing rapid shifting of the liquid thereby preventing rapid shifting of the weight of the liquid within the tank 10.

As illustrated in Figures 1 and 2, a reinforcement plate 34 is provided on the top 18 and is provided with an inlet filler adapter 36 and a pump adapter 38 having a pump 40 with a suction pipe 42 extending downwardly therethrough wherein the suction pipe 42 terminates adjacent the bottom 12 wherein a reinforcement plate 44 is disposed thereon to prevent excessive wear of the bottom 12 in the event the pipe 42 would come into contact therewith thereby assuring long life and proper operation of the fuel tank and pump and eliminating the objectionable weight shifting caused by the shifting of the liquid in the tank.

Also, a reinforcing brace 35 may be provided transversely of the tank in parallel relation to the end wall 16 and underlying the inner edge of plate 34 thereby preventing cracking of the top 18 along the edge of the plate 34.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A tank comprising a bottom, side walls, end walls and a top integrally connected, said top having an opening for filling the tank with liquid, a centrally disposed baffle plate disposed between and parallel to said end walls, said baffle plate having the corners thereof omitted to permit restricted flow of liquid within the tank thereby preventing rapid shifting of liquid, a plurality of cylindrical baffles in said tank extending from the bottom to the top thereof, inwardly extending notches on opposite sides of each of the cylindrical baffles and at each end thereof for restricting flow of liquid within the tank, the notches in the cylindrical baffles being misaligned with the omitted corners of the baffle plate thereby providing a tortuous path of flow for the liquid.

2. The combination of claim 1 wherein said cylindrical baffles are in edge-to-edge engagement with each other with the baffle plate interconnecting the central baffles.

3. A fuel tank comprising a pair of parallel end and side wall interconnected with a bottom and top, means for permitting inlet and outlet of fuel through the top of the tank, a plurality of cylindrical members interconnecting the top and bottom with the members engaging each other and also the peripheral walls of the tank thereby providing a plurality of compartments, a transverse baffle plate disposed between the end plates and being disposed in parallel relation thereto, said baffle plate separating the tank into two equal compartments and extending between adjacent cylindrical members and being disposed in tangential relation thereto, said baffle plate having the corners thereof omitted for communicating the equal compartments for permitting restricted fuel flow therebetween, each of said cylindrical members having diametrically opposed notches at each end thereof for communicating the interior of the cylindrical members with each other and with the space between the members and the peripheral walls of the tank, said notches and omitted corners being misaligned for providing a tortuous fuel flow path for reducing rate of flow thereof.

References Cited in the file of this patent

UNITED STATES PATENTS

| | | |
|---|---|---|
| 1,616,008 | Stout | Feb. 1, 1927 |

FOREIGN PATENTS

| | | |
|---|---|---|
| 641,704 | France | Apr. 23, 1928 |
| 482,760 | Great Britain | Apr. 5, 1938 |
| 152,233 | Australia | July 8, 1953 |